(12) United States Patent
Zhang et al.

(10) Patent No.: US 8,619,073 B2
(45) Date of Patent: Dec. 31, 2013

(54) SYSTEM AND METHOD FOR RECOVERING THREE-DIMENSIONAL PARTICLE SYSTEMS FROM TWO-DIMENSIONAL IMAGES

(75) Inventors: Dong-Qing Zhang, Plainsboro, NJ (US); Ana Belen Benitez, Brooklyn, NY (US); James Arthur Fancher, Marina Del Rey, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 977 days.

(21) Appl. No.: 12/447,029

(22) PCT Filed: Oct. 27, 2006

(86) PCT No.: PCT/US2006/042586
§ 371 (c)(1),
(2), (4) Date: Apr. 24, 2009

(87) PCT Pub. No.: WO2008/051231
PCT Pub. Date: May 2, 2008

(65) Prior Publication Data
US 2010/0315410 A1 Dec. 16, 2010

(51) Int. Cl.
*G06T 15/00* (2011.01)
(52) U.S. Cl.
USPC .......................................................... 345/419
(58) Field of Classification Search
None
See application file for complete search history.

(56) References Cited

U.S. PATENT DOCUMENTS

| 5,912,721 A * | 6/1999 | Yamaguchi et al. .......... 351/210 |
| 6,208,348 B1 | 3/2001 | Kaye |
| 7,518,611 B2 * | 4/2009 | Boyd et al. ..................... 345/473 |
| 2007/0188336 A1* | 8/2007 | Privalov ........................ 340/628 |

FOREIGN PATENT DOCUMENTS

JP 2005-339127 12/2005

OTHER PUBLICATIONS

Szeliski et al. (Recovering 3D Shape and Motion from Image Stream using Non-linear Least Squares, Mar. 1993).*
Kiran S Bhat: "Creating Realistic Animation Using Video", Dec. 10, 2004, pp. 1-66, XP002427038 CMU, Pittsburg Pennsylvania pp. 15-18, 22-52, 60-66.

(Continued)

*Primary Examiner* — Ke Xiao
*Assistant Examiner* — Kyle Zhai
(74) *Attorney, Agent, or Firm* — Robert D. Shedd; Vincent E. Duffy; James McKenzie

(57) ABSTRACT

A system and method for recovering three-dimensional (3D) particle systems from two-dimensional (2D) images are provided. The system and method of the present invention provide for identifying a fuzzy object in a two-dimensional (2D) image; selecting a particle system from a plurality of predetermined particle systems, the selected particle system relating to a predefined fuzzy object; generating at least one particle of the selected particle system; simulating the at least one particle to update states of the at least one particle; rendering the selected particle system; comparing the rendered particle system to the identified fuzzy object in the 2D image; and storing the selected particle system if the comparison result is within an acceptable threshold, wherein the stored particle system represents the recovered geometry of the fuzzy object.

20 Claims, 4 Drawing Sheets

(56) References Cited

OTHER PUBLICATIONS

Y. Okuno, Y. Sugii, S. Nishio: "Image Measurement of Flow Field Using Physics-Based Dynamic Model" Meas. Sci. Technol., vol. 11, 2000, pp. 667-676, XP002427039 abstract; figures 1,2,13,16 pp. 668-670.

Jean Louchet, Li Juang: "An Identification Tool to Build Physical Models for Virtual Reality" Proceedings of IWISP 96, Nov. 1996, pp. 669-672, XP002427040 Manchester the whole document.

Gunji Kakogawa, "Recent Advances in Particle Systems, "Nikkei CG, No. 169, pp. 46-79, Nikkei Business Publications, Inc., Japan, Oct. 8, 2000.

Matsukiz, Yasuaki, "Near-Future CG Techology, 'Computer Graphics of the Future', What research is currently conducted in High-End CG?," MdN, vol. 48, pp. 142-145 Apr. 1995, MdN Corp., Japan, Apr. 1, 1998.

Reeves, William T. et al., Particle Systems—A Technique for Modeling a Class of Fuzzy Objects, Apr. 1983. vol. 2, No. 2, pp. 91-108.

Lucas, Bruce, et al., "An Iterative Image Registration Technique with an Application to Stereo Vision," Proc. $7^{th}$ Intl. Joint Conf. on Artificial Intelligence, pp. 674-679, Canada, Aug. 24, 1981.

Hasler, "Physically Based 3D Reconstruction of Cloth for Tracking of Simple Textiles from Video Images", May 31, 2006.

Takeuchi, Yoshiaki "Weather Prediction Simulation Which Becomes Highly Sophisticated" System/Control/Information, vol. 48. No. 7, pp. 19-24, The Institute of Systems Control and Information Engineers.

Muraoka, et al. "Image Information Engineering and Boradcasting Techique" vol. 49, No. 10, pp. 1252-1258, The Institute of Television Engineers of Japan.

* cited by examiner

STATIC PARTICLE

DYNAMIC PARTICLE

SYSTEM AND METHOD FOR RECOVERING THREE-DIMENSIONAL PARTICLE SYSTEMS FROM TWO-DIMENSIONAL IMAGES

This application claims the benefit under 35 U.S.C. §365 of International Application PCT/US2006/042586, filed Oct. 27, 2006, which was published in accordance with PCT article 21(2) on May 2, 2008 in English.

TECHNICAL FIELD OF THE INVENTION

The present invention generally relates to computer graphics processing and display systems, and more particularly, to a system and method for recovering three-dimensional (3D) particle systems from two-dimensional (2D) images.

BACKGROUND OF THE INVENTION

Recovering three-dimensional (3D) geometry from a single image has been a standing problem in computer vision and computer graphics for a long time. Current techniques only deal with recovering the geometry of solid or deformable objects from two-dimensional (2D) images in the form of polygon meshes. None of the existing work deals with the recovery of the 3D geometry of fuzzy objects, e.g., fire grass, trees, water, etc., particularly to recover the particle systems that could have generated the 2D fuzzy objects in the images.

Recovering 3D information from 2D images is important for future film production systems. One of the important applications is to reconstruct 3D geometry of a scene from a single 2D image, a process known as 2D-to-3D conversion. Because recovering 3D from 2D is an ill-posed problem, human interactions is needed for accurate 3D constructions. Such semi-automatic approaches have been utilized in the 2D-to-3D conversion system developed by a company called In-Three, Inc. of Westlake Village, Calif., which specializes in making stereoscopic films from regular 2D films. The 2D-to-3D conversion system is described in U.S. Pat. No. 6,208,348 issued on Mar. 27, 2001 to Kaye. In the 2D-to-3D process, a geometry dimensionalist has to create 3D geometries or stereoscopic pairs that match objects in the input image. It may be easy for human editors to create or modify the geometries of solid or deformable objects such as buildings and human bodies, but it is very time consuming and difficult for human editors to create 3D geometries to match the fuzzy objects, such as trees and clouds, in 2D images.

Although there has been much prior work on single-view 3D geometry recovery, there appears to have been little focus on recovering the 3D geometry of the fuzzy objects from 2D images. A system and method for recovering the 3D geometry of the fuzzy objects from 2D images is, therefore, desired.

SUMMARY

The present disclosure provides a system and method for recovering three-dimensional (3D) particle systems from two-dimensional (2D) images. The geometry reconstruction system and method of the present disclosure recovers 3D particle systems representing the geometry of fuzzy objects from 2D images. The geometry reconstruction system and method identifies fuzzy objects in 2D images, which can, therefore, be generated by a particle system. The identification of the fuzzy objects is either done manually by outlining regions containing the fuzzy objects with image editing tools or by automatic detection algorithms. These fuzzy objects are then further analyzed to develop criteria for matching them to a library of particle systems. The best match is determined by analyzing light properties and surface properties of the image segment both in the frame and temporally, i.e., in a sequential series of images. The system and method simulate and render a particle system selected from the library, and then, compare the rendering result with the fuzzy object in the image. The system and method of the present invention will determine whether the particle system is a good match or not according to certain matching criteria.

According to one aspect of the present invention, a three-dimensional (3D) reconstruction process includes identifying a fuzzy object in a two-dimensional (2D) image, selecting a particle system from a plurality of predetermined particle systems, the selected particle system relating to a predefined fuzzy object, simulating the selected particle system, rendering the simulated particle system, comparing the rendered particle system to the identified fuzzy object in the 2D image, and wherein if the comparison result is less than a predetermined threshold, accepting the elected particle system to represent the geometry of the identified fuzzy object.

According to another aspect of the present invention, a system for three-dimensional (3D) reconstruction of fuzzy objects from two-dimensional (2D) images is provided. The system includes a post-processing device configured for reconstructing a three-dimensional model of a fuzzy object from at least one 2D image, the post-processing device including an object detector configured for identifying at least one fuzzy object in a 2D image, a particle system generator configured for generating and simulating a particle system, a particle renderer configured for rendering the generated particle system, and a reconstruction module configured for selecting a particle system from a plurality of predetermined particle systems, the selected particle system relating to a predefined fuzzy object, comparing the rendered particle system to the at least one identified fuzzy object in the 2D image, and storing the selected particle system if the comparison result is less than a predetermined threshold, wherein the stored particle system represents the recovered geometry of the at least one identified fuzzy object.

In a further aspect of the present invention, a program storage device readable by a machine, tangibly embodying a program of instructions executable by the machine to perform method steps for recovering a three-dimensional (3D) particle system from a two-dimensional (2D) image is provided, the method including identifying a fuzzy object in a two-dimensional (2D) image, selecting a particle system from a plurality of predetermined particle systems, the selected particle system relating to a predefined fuzzy object, simulating the selected particle system, rendering the simulated particle system, comparing the rendered particle system to the identified fuzzy object in the 2D image, and storing the selected particle system if the comparison result is less than a predetermined threshold, wherein the stored particle system represents the recovered geometry of the fuzzy object.

BRIEF DESCRIPTION OF THE DRAWINGS

These, and other aspects, features and advantages of the present invention will be described or become apparent from the following detailed description of the preferred embodiments, which is to be read in connection with the accompanying drawings.

In the drawings, wherein like reference numerals denote similar elements throughout the views.

Figure 1A:
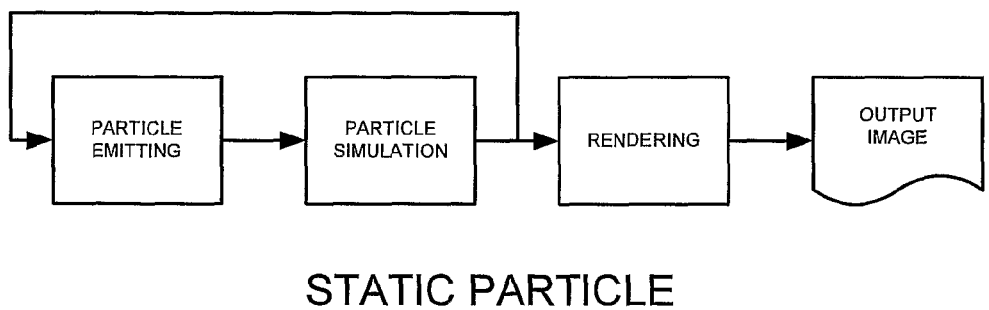
FIG. 1A is a flow diagram of a static particle system iteration process.

It should be understood that the drawing(s) is for purposes of illustrating the concepts of the invention and is not necessarily the only possible configuration for illustrating the invention.

DETAILED DESCRIPTION OF PREFERRED EMBODIMENTS

It should be understood that the elements shown in the Figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In computer graphics, solid or deformable objects, such as buildings and human bodies, are represented as analytic or polygon meshes, such as NURBS (Non-Uniform Rational Bezier Spline) and triangular meshes. However, it is difficult to represent fuzzy object as meshes. Instead, fuzzy objects are often generated with a technique called a particle system. A way of recovering the geometry of fuzzy objects is provided by enabling the selection of particles system that have some predefined specification (for example, for recovering trees, the leaves can be predefined particle primitives). Particle systems with different specifications, i.e., for different fuzzy objects, will be collected in a library to serve 3D reconstruction applications of the present invention.

The system and method of the present invention deals with the problem of recovering the 3D particle system whose rendering would match 2D fuzzy objects, such as cloud, trees, and waves in 2D images.

The recovered particle system is referred to as a matched particle system. The process is referred to as matching a particle system to an image. Such a system is useful for 2D film to 3D film conversion and other VFX (visual effects) production applications that require the 3D geometry of the scene.

A particle system consists of a set of primitives (e.g., particles). Each of these particles has attributes that directly or indirectly affect the behavior of the particle or how and where the particle is rendered. The particles are generated and simulated by the system with a set of controlling parameters such as generating rate or emitting rate, position, velocity, particle lifetime, particle color fading parameters, age shape, size and transparency. A set of controlling parameters will be defined for each of different types of fuzzy objects, e.g., trees, clouds, etc., and stored in a library of particle systems as will be described below.

Figure 1B:
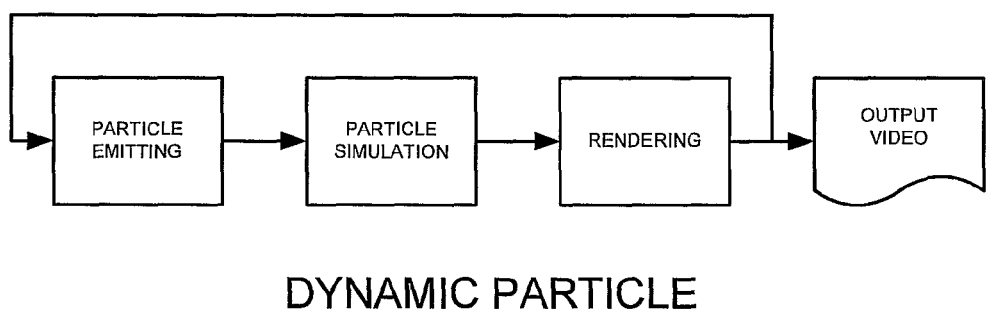
FIG. 1B is a flow diagram of a dynamic particle system iteration process.

Generally, the status of a particle system iterates among three steps: particle emitting, particle simulation, and rendering (as shown in FIGS. 1A and 1B). Particle emitting generates new particles. The attributes or controlling parameters of each new generated particle is given an initial value which may be fixed or determined by a stochastic process. Particle simulation simulates the physics of the existing particles, and controls the death of the existing particles. The attributes of each particle may vary over time or can be functions of both time and other particle attributes. Rendering renders the 3D particle systems into 2D images, i.e., converts the 3D particle system into visual form via, for example, a display.

Particle systems can be classified into static particle systems and dynamic particle systems. In static particle systems as illustrated in FIG. 1A, the rendering of a particle system only occurs once after the completion of the particle simulation. The rendering result produces the image of the static fuzzy object. In dynamic particle systems as illustrated in FIG. 1B, particles are continuously generated and simulated. Particles can die off and change their states (such as color) over time. Rendering is performed after each simulation step, which can mimic the behavior of dynamic fuzzy objects, such as waving water. The rendering result produces a video output of the fuzzy object.

The reason for recovering 3D particle systems is to reconstruct the geometry of fuzzy objects from their 2D projection in images. Compared to solid object geometry recovery, fuzzy object geometry recovery faces two challenges. First, the boundary between a fuzzy object and the background is usually not clear, which greatly complicates isolating fuzzy objects from the background. Second, it is very difficult to parameterize fuzzy objects, since fuzzy objects do not usually have uniform shapes. Therefore, while prior methods may have been able to use a model-based approach to estimate the global geometric parameters of solid objects, geometric parameter estimation cannot be applied to fuzzy objects. The deformation or relationship between two particle systems cannot be described by simple parametric functions, such as affine transformation. The system and method of the present invention utilizes a simulation-based approach for estimating the particle states and parameters. The system and method simulate and render the particle system, and, then, compare the rendering result with the fuzzy object in the image. Then, the system and method of the present invention will determine whether the particle system is a good match or not according to certain matching criteria. Different methods for recovering static and dynamic particle systems will be described below.

Figure 2:
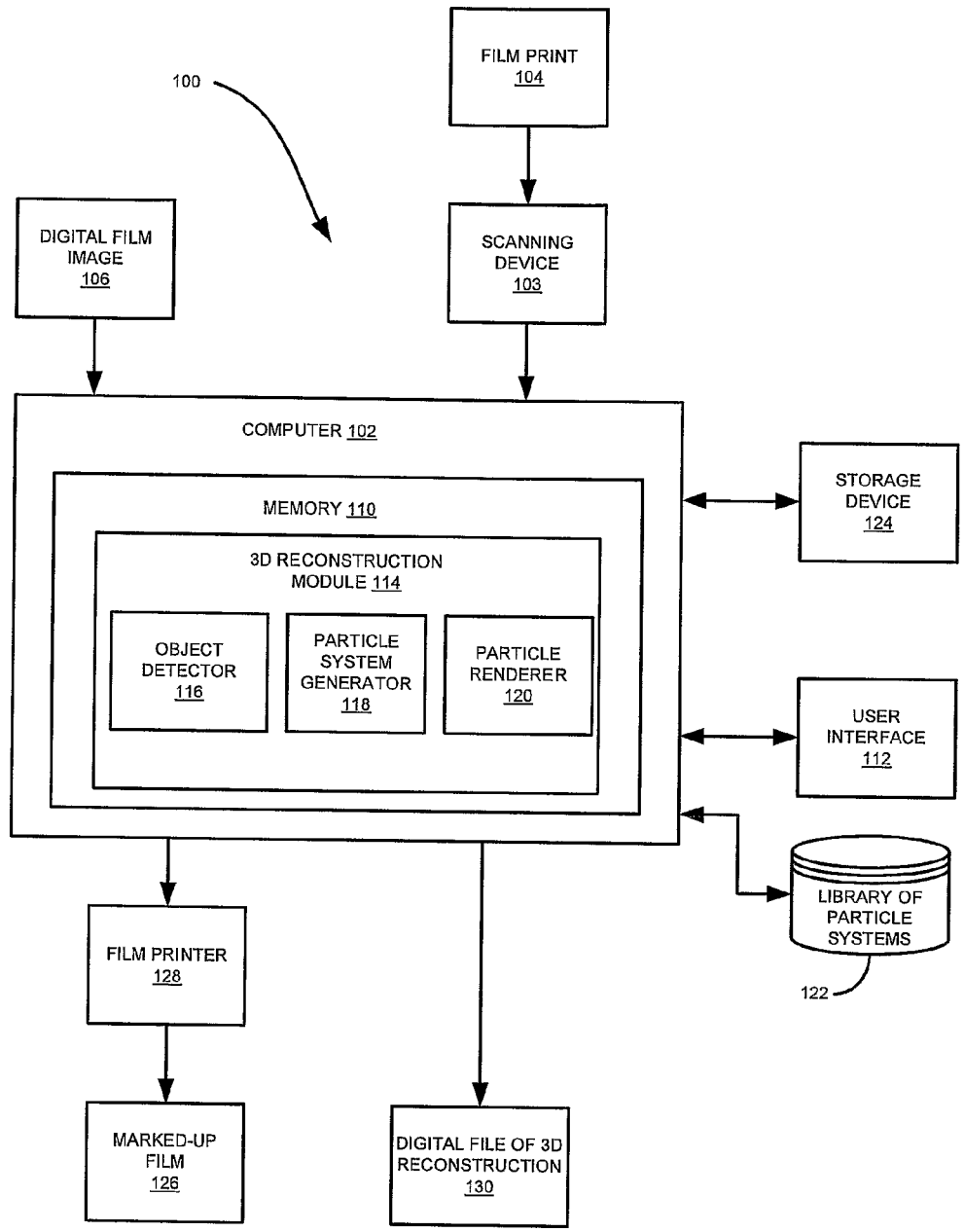
FIG. 2 is an exemplary illustration of a system for recovering three-dimensional (3D) particle systems from two-dimensional (2D) images according to an aspect of the present invention.

Referring now to the Figures, exemplary system components according to an embodiment of the present disclosure are shown in FIG. 2. A scanning device 103 may be provided for scanning film prints 104, e.g., camera-original film negatives, into a digital format, e.g. Cineon-format or Society of Motion Picture and Television Engineers (SMPTE) Digital Picture Exchange (DPX) files. The scanning device 103 may comprise, e.g., a telecine or any device that will generate a video output from film such as, e.g., an Arri LocPro™ with video output. Alternatively, files from the post production process or digital cinema 106 (e.g., files already in computer-readable form) can be used directly. Potential sources of computer-readable files are AVID™ editors, DPX files, D5 tapes etc.

Scanned film prints are input to a post-processing device 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In addition, various other peripheral devices may be connected to the computer platform by various interfaces and bus structures, such a parallel port, serial port or universal serial bus (USB). Other peripheral devices may include additional storage devices 124 and a printer 128. The printer 128 may be employed for printed a revised version of the film 126 wherein scene may have been altered or replaced using 3D modeled objects as a result of the techniques described below.

Alternatively, files/film prints already in computer-readable form 106 (e.g., digital cinema, which for example, may be stored on external hard drive 124) may be directly input into the computer 102. Note that the term "film" used herein may refer to either film prints or digital cinema.

A software program includes a three-dimensional (3D) reconstruction module 114 stored in the memory 110 for reconstructing 3D fuzzy objects from 2D images. The 3D reconstruction module 114 includes an object detector 116 for identifying fuzzy objects in 2D images. The object detector 116 identifies objects either manually by outlining image regions containing fuzzy objects by image editing software or by isolating image regions containing fuzzy objects with automatic detection algorithms. The 3D reconstruction module 114 also includes a particle system generator 118 for generating and controlling/simulating particle systems. The particle system generator will interact with a library of particle systems 122 as will be described below. The library of particle systems 122 will include a plurality of predetermined particle systems where each particle system relates to a predefined fuzzy object. For example, one of the predetermined particle systems may be used to model trees. The tree-based particle system will include controlling parameters or attributes for particles generated to simulate a tree. The controlling parameters or attributes for each particle may include but are not limited to position, velocity (speed and direction), color, lifetime, age, shape, size, transparency, etc.

A particle renderer 120 is provided for rendering the generated particle system, for example, on a display.

Initially, a method for recovering static particle systems from single images will be described; then, the method will be extended for recovering particle systems from sequences of images (for example, a video clip).

Figure 3:
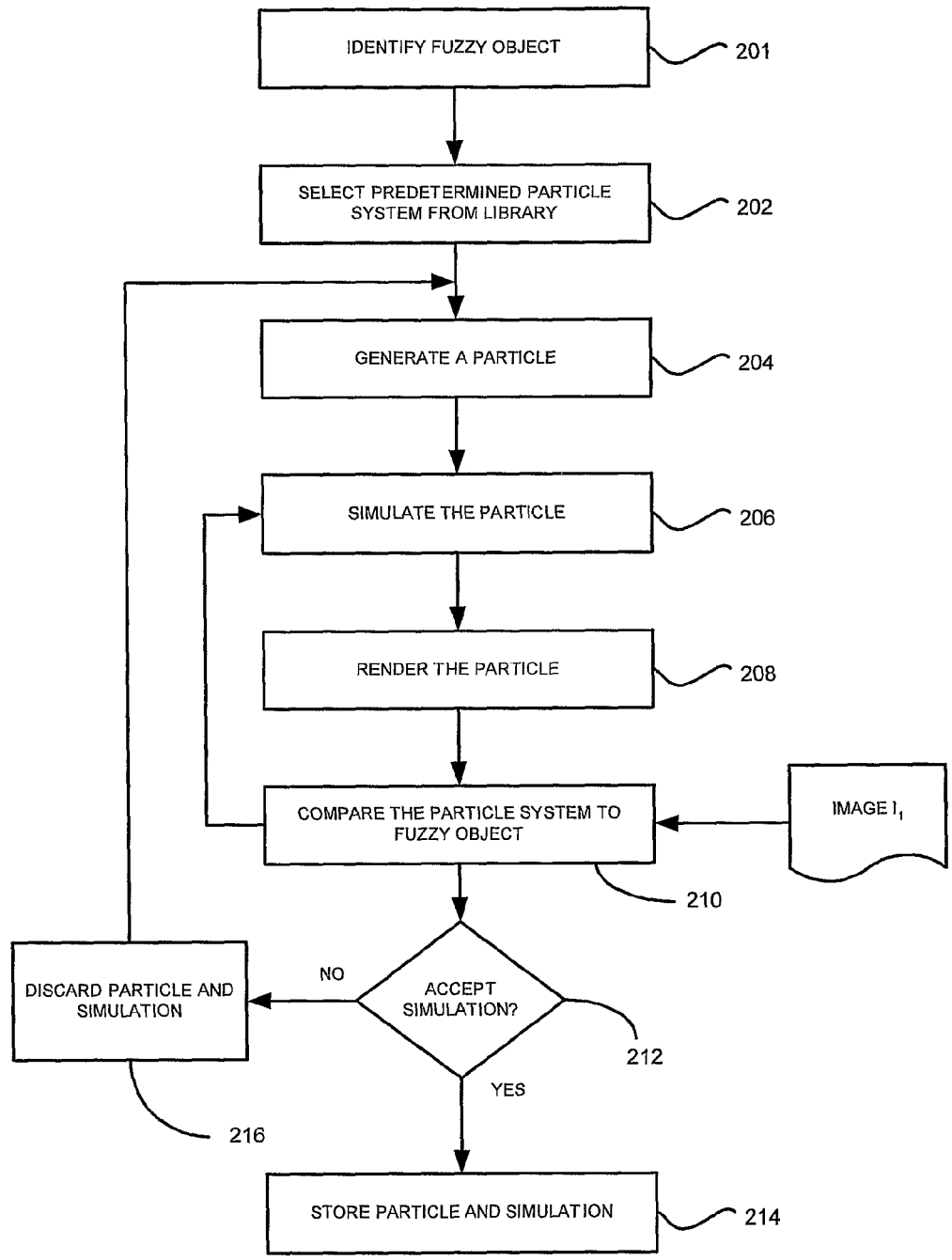
FIG. 3 is a flow diagram of an exemplary method for recovering three-dimensional (3D) particle systems from a two-dimensional (2D) image according to an aspect of the present invention.

FIG. 3 is a flow diagram of an exemplary method for reconstructing three-dimensional (3D) objects from a two-dimensional (2D) image according to an aspect of the present invention. The particle system recovery from single images can be realized by a simulation-based approach by trial-and-error.

Initially, the post-processing device 102 obtains the digital master video file in a computer-readable format. The digital video file may be acquired by capturing a temporal sequence of video images with a digital video camera. Alternatively, the video sequence may be captured by a conventional film-type camera. In this scenario, the film is scanned via scanning device. The camera will acquire 2D images while moving either the object in a scene or the camera. The camera will acquire multiple viewpoints of the scene.

It is to be appreciated that whether the film is scanned or already in digital format, the digital file of the film will include indications or information on locations of the frames, e.g., a frame number, time from start of the film, etc. Each frame of the digital video file will include one image, e.g., $I_1$, $I_2$, ... $I_n$.

FIG. 3 illustrates an iterative process for finding particle systems that can generate images or a part of an image. In each iteration, the system generates a new particle. Initially, in step 201, a fuzzy object in an image is identified. Using the object detector 116, a fuzzy object may be manually selected by a user using image editing tools, or alternatively, the fuzzy object may be automatically detected using image detection algorithm, e.g., segmentation algorithms. The visual appearance of the outlined region (i.e., the fuzzy object) determines the particular particle system that would be selected from the particle system library 122 for matching.

The best match between a predetermined particle system and input image is determined by analyzing the visual properties (e.g., shape, color, texture, motion etc.) of the image regions both within the frame and temporally.

Once the fuzzy object to be reconstructed is identified, at least one of the plurality of predetermined particle systems is selected (step 202) from the library of predetermined particle systems 122. Each of the predetermined particle systems is developed to simulate a predefined fuzzy object, e.g., a tree, clouds, etc. The selected predetermined particle system will be selected to attempt to match the content of the fuzzy object from the image. The selected predetermined particle system will include the controlling parameters for the particle system. The controlling parameters (e.g. position) of the particle are determined in a random fashion. An exemplary approach is to draw the particle states from a probability distribution, where such probability distribution can be either determined before the iteration or dynamically adapted to the system during the iteration. Once the controlling parameters are defined, particles are generated, at step 204, one after another via the particle system generator 118.

For each particle generated by the particle generator, a simulation procedure is conducted, at step 206, to update the states of the particle so that the appearance of the added particle matches the image content better. For example, if the particles are associated with states including particle position, speed and size, then the simulation process will update all of these parameters under certain physical constraints, for instance according to the law of energy conservation. The results of the simulation will cause the particle system to be rendered via the particle renderer 120.

In step 208, a rendering procedure is carried out for the purpose of the comparison. Rendering algorithms are known by those skilled in the visual effects or computer graphics art. Popular rendering algorithms include but are not limited to rasterization, ray tracing and photon mapping. For ray tracing, objects are rendered by tracing back the corresponding light rays from the image pixels to the light sources, the pixel colors are then determined by the reflectance of the object surface and properties of the light sources.

For each new particle, a comparison is performed, at step 210, locally between the rendered particle and the image pixels of the fuzzy object located in a small window of the image $I_1$. Various known difference metrics can be used for the comparison. An exemplary difference metric between the rendered particle and the image region is the Least Square Difference (LSD). Assuming the rendered particle image is P(x,y) and the identified region or sub-image in the window is I(x,y), then the LSD is calculated as follows:

$$D = \sum_{(x,y) \in L} [P(x, y) - I(x, y)]^2$$

where x and y are spatial coordinates of a pixel and P and I represent the color intensity values at the pixel. In one embodiment, the color intensity value is a single number, for example, in a grayscale image. In another embodiment, the color intensity values will be the RGB values of each pixels, i.e., three numbers. The above summation is performed over all the pixels on the image region identified by the object detector 116.

The method iterates back to step 206 until all the particles in the identified region, i.e., where the fuzzy object lies, have been processed. In one embodiment, during the iterations, the controlling parameters do not change, namely the same particle system pre-selected from particle system library is used throughout the iterations. In other embodiments, the controlling parameters are dynamically changed during each iteration to attempt to find the best match between the particle system and image.

The output of the difference metric is then used by the system, in step 212, to determine if the generation of the particles should be accepted or not. Finding the optimal particle state is realized by minimizing the above difference measure with respect to the particle state, i.e., changing the particle states such that a minimum difference is achieved between the rendered image and the input image. If the mapping from the particle states to its image is analytic, a closed-form solution to obtain the states can also be derived by a gradient descent method.

Basically, if the result or output of the difference metric is less than a predetermined threshold, the generation of the particles will be accepted, i.e., the recovered particle system is a matched particle system. The predetermined threshold may be determined empirically based on experiments. If the generation and simulation step is acceptable, the particle system will be stored, at step 214, to represent the recovered geometry of the fuzzy object. Otherwise, if the result of the difference metric is above the predetermined threshold, the particle system, at step 216, will be discarded.

Recovering dynamic particle systems can be realized by estimating static particle systems for each frame of a video sequence. However, to accelerate the conversion process, the particle states from the previous frame could be used as the initial particle states in the current frame. This narrows down the search space, and therefore, the computational costs.

Figure 4:
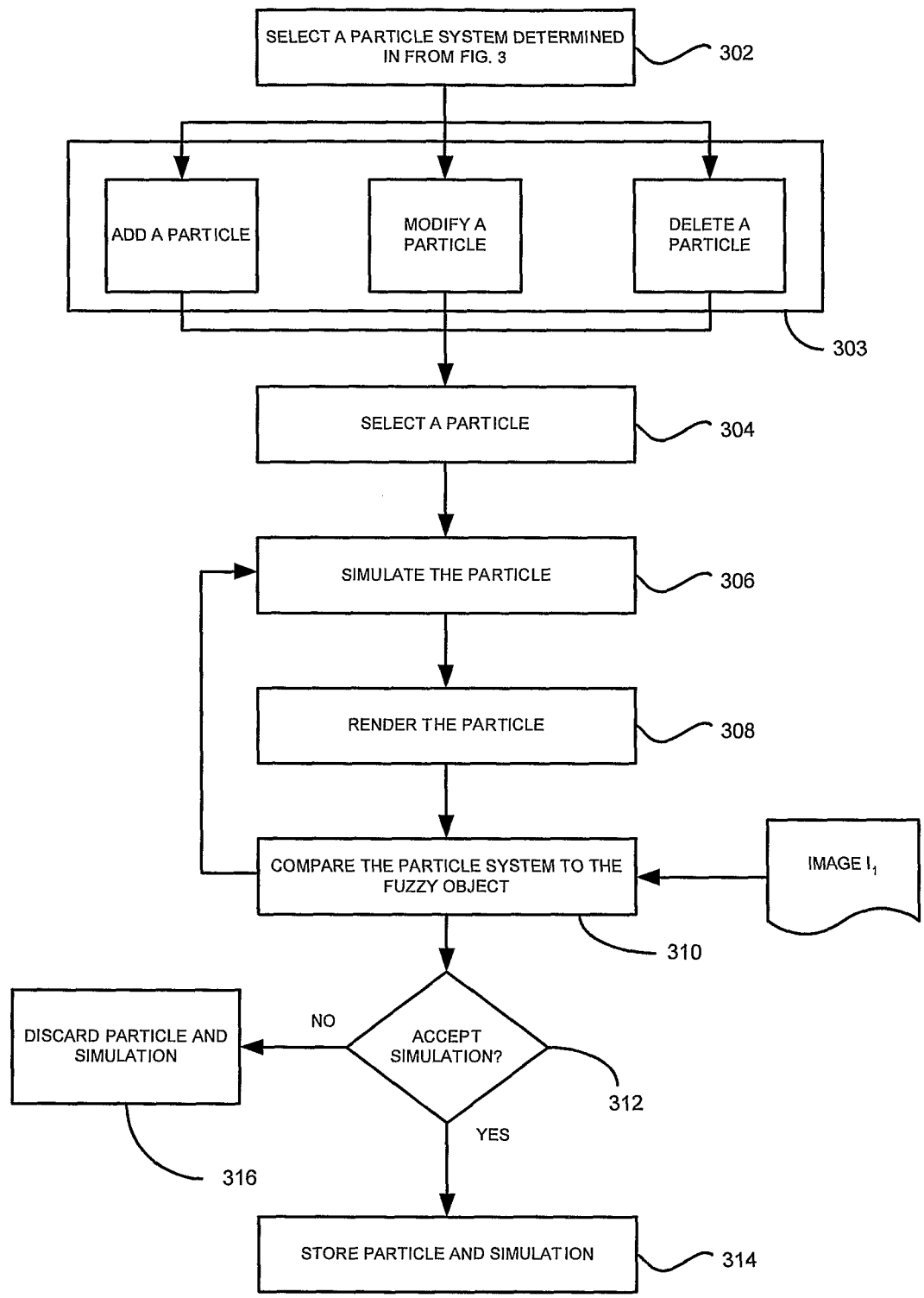
FIG. 4 is a flow diagram of an exemplary method for recovering three-dimensional (3D) particle systems from at least two two-dimensional (2D) images according to an aspect of the present invention.

When recovering a particle system from a sequence of images, additional information about the particles may be obtained from different camera viewpoints. Such information can be utilized to improve the accuracy of the matching process. In particular, the initial particle system can be generated using a single image, then, the particle system can be refined using the rest of the images of the video sequence. Referring to FIG. 4, the refinement process can be realized through a random sampling and simulation process. The sampling process may add additional particles, delete some of the particles or change the particle states in the particle system.

Referring to FIG. 4, in step 302, an initial acceptable particle system is selected as described above in relation to FIG. 3. A random sampling procedure will then start from one of the three branches shown in step 303: particle birth (i.e. add a particle); particle state change (i.e., modify a particle); and particle death (i.e., delete a particle). In the birth process, a particle is added and simulated in steps 304 and 306, similar to the process described above in relation to FIG. 3.

The process then determines if the addition is acceptable or advantageous in steps 310 and 312, similar to step 210 and 212 described above, where the output of the difference metric is computed and thresholded to determine if the addition would be accepted. In the death process, a particle is selected to be removed from the system and then the process determines if the removal is acceptable or advantageous. In the state change process, a particle is randomly selected and a simulation and comparison process is conducted to change the states of the particle to match the new image better.

A system and method for recovering static and dynamic particle systems from one image or a sequence of images have been provided. The techniques disclosed recover 3D particle systems by performing a comparison between the input image and the rendered particle system. Since the system and method employs a simulation-based approach, in which particles are emitted one after another, the comparison is conducted locally around the generated particle rather than globally using the entire image. In this manner, the best match between a predetermined particle system and input image is determined by analyzing the visual properties (e.g., shape, color, texture, motion etc.) of the image regions both within the frame and temporally.

The recovered 3D model of a particular fuzzy object may then be saved in a digital file 130 separate from the file containing the image(s). The digital file of 3D object 130 may be stored in storage device 124 for later retrieval, e.g., during an editing stage of the film where a modeled object may be inserted into a scene where the object was not previously present, for example, by compositor.

Although the embodiment which incorporates the teachings of the present invention has been shown and described in detail herein, those skilled in the art can readily devise many other varied embodiments that still incorporate these teachings. Having described preferred embodiments for a system and method for recovering three-dimensional (3D) particle systems from two-dimensional (2D) images (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims.

What is claimed is:

1. A method for recovering a three dimensional particle system representation of a fuzzy object from a two dimensional image, the method comprising:
   identifying a fuzzy object in a two-dimensional image;
   selecting a three-dimensional particle system from a plurality of predetermined three-dimensional particle systems, the particle system relating to a predefined fuzzy object;
   simulating the particles as a three dimensional image;
   rendering the simulated particles as a two dimensional image;
   comparing the rendered two dimensional image to the identified fuzzy object; and
   wherein if the comparison result is less than a predetermined threshold, accepting the selected three-dimensional particle system to represent a geometry of the identified fuzzy object.

2. The method as in claim 1, further comprising: and simulating the at least one particle to update states of the at least one particle.

3. The method as in claim 2, wherein each of the plurality of predetermined particle systems includes controlling parameters for simulating at least one particle of the predetermined particle system.

4. The method as in claim 3, wherein the controlling parameters include at least one of position, velocity, speed and direction, color, lifetime, age, shape, size or transparency.

5. The method as in claim 2, further comprising updating the at least one particle of the selected particle system with a second two-dimensional image.

6. The method as in claim 5, wherein the updating step includes adding at least one particle, deleting at least one particle or modifying a state of the at least one particle.

7. The method as in claim 6, wherein the at least one particle is selected from the stored particle system.

8. The method as in claim 1, wherein the comparing step is performed by using a difference metric.

9. The method as in claim 1, wherein the comparing step further comprises determining the least square difference between at least one particle of the rendered two dimensional image and at least one pixel of the identified fuzzy object in the two-dimensional image.

10. The method as in claim 1, wherein the identifying step includes outlining a region in the two-dimensional image including the fuzzy object.

11. A system for three-dimensional reconstruction of fuzzy objects from two-dimensional images, the system comprising:
   a post-processing device configured for reconstructing a three-dimensional model of a fuzzy object from a two-dimensional image, the post-processing device including:
      an object detector configured for identifying the fuzzy object in the two-dimensional image;
      a particle system generator configured for generating particles and simulating the particles as a three dimensional image;
      a particle renderer configured for rendering the generated particles as a two dimensional image; and
      a reconstruction module configured for selecting a three-dimensional particle system from a plurality of predetermined three-dimensional particle systems, the particle system relating to a predefined fuzzy object, comparing the rendered two dimensional image to the identified fuzzy object, and storing the selected three-dimensional particle system into a library if the comparison result is less than a predetermined threshold, wherein the stored particle system represents a recovered geometry of the identified fuzzy object.

12. The system as in claim 11, wherein the particle system generator is further configured to simulate at least one particle of the particle system by updating a state of the at least one particle.

13. The system as in claim 12, wherein each predetermined particle system of the plurality of predetermined particle systems includes controlling parameters for simulating at least one particle.

14. The system as in claim 13, wherein the controlling parameters include at least one of position, velocity, speed and direction, color, lifetime, age, shape, size or transparency.

15. The system as in claim 12, wherein the reconstruction module is further configured to update the at least one particle of the selected particle system with a second two-dimensional image.

16. The system as in claim 15, wherein the reconstruction module is further configured to update the selected particle system by adding at least one particle, deleting at least one particle or modifying the state of the at least one particle.

17. The system as in claim 11, wherein the reconstruction module is further configured to compare the rendered two dimensional image to the identified fuzzy object in the two-dimensional image by a difference metric.

18. The system as in claim 11, wherein the reconstruction module is further configured to compare the rendered two dimensional image to the identified fuzzy object in the two-dimensional image by determining the least square difference between at least one particle of the rendered two dimensional image and at least one pixel of the identified fuzzy object in the two-dimensional image.

19. The system as in claim 11, wherein the object detector is configured to identifying the at least one fuzzy object by outlining a region in the two-dimensional image including the at least one fuzzy object.

20. A program storage device readable by a machine, tangibly embodying a program of instructions executable by the machine to perform method steps for recovering a three-dimensional particle system from a two-dimensional image, the method comprising:

identifying a fuzzy object in a two-dimensional image;

selecting a three-dimensional particle system from a plurality of predetermined three-dimensional particle systems, the three-dimensional particle system relating to a predefined fuzzy object;

generating particles based on the selected three-dimensional particle system;

simulating the particles as a three dimensional image;

rendering the simulated particles as a two dimensional image;

comparing the rendered two dimensional image to the identified fuzzy-object; and storing the selected three-dimensional particle system into a library if the comparison result is less than a predetermined threshold, wherein the stored particle system represents a recovered geometry of the fuzzy object.

* * * * *